United States Patent Office 3,491,125
Patented Jan. 20, 1970

3,491,125
SULFONATED 1-AMINO - 4-(2',6'-DIMETHYL-ANILINO) - 2 - PHENOXY - ANTHRAQUINONES WITH A CHLOROACETYLAMINO-METHYL GROUP
Hans-Rudolf Schwander and Jean-Pierre Jung, Riehen, and Peter Hindermann, Bottmingen, Switzerland, assignors to J. R. Geigy A.G., Basel, Switzerland
No Drawing. Continuation-in-part of applications Ser. No. 462,073, June 7, 1965, and Ser. No. 530,351, Feb. 28, 1966. This application Mar. 24, 1967, Ser. No. 625,592
Int. Cl. C09b 1/54, 1/52
U.S. Cl. 260—372
6 Claims

ABSTRACT OF THE DISCLOSURE 1-amino-2-phenoxy-4-phenylamino anthraquinone dyes having the grouping —CH$_2$NH—CO—CH$_2$Cl linked to one of the benzene nuclei of the aforesaid substituents in 2- and 4-position, preferably mono- or di-sulfonated, useful for the dyeing of wool and man-made polyamide fibers.

RELATED EARLIER APPLICATIONS

This application is a continuation-in-part of our applications Ser. Nos. 462,073 (U.S. Patent 3,376,320), filed June 7, 1965, and 530,351 (now abandoned), filed Feb. 28, 1966, both of which are in turn continuations-in-part of our abandoned patent applications Ser. Nos. 261,864 and 261,865, both filed on Feb. 28, 1963, as continuations of our abandoned patent application Ser. No. 806,998, filed Apr. 17, 1959.

SUMMARY OF THE INVENTION

The present invention concerns new fiber-reactive acid anthraquinone dyestuffs, processes for their production, the use thereof especially for the batch dyeing and printing of fiber material containing polyamide, especially wool, as well as, as industrial products, the materials dyed and printed therewith.

GENERAL DESCRIPTION OF THE INVENTION

We have found that amino anthraquinone dyestuffs of the most different types can be converted into more valuable new dyestuffs by the introduction of halogen acylamino methyl groups. The reaction products according to the invention are 1-amino-anthroquinone dyes which are substituted in 2-position by phenoxy and in 4-position by phenylamino radicals and have the grouping

linked to one of the benzene nuclei of the aforesaid substituents in 2- and 4-position. Y in this grouping represents a lower haloalkyl radical wherein halo is a halogen atom of the atomic weight of at least 35 and at most 80, but preferably chlorine. The benzene nuclei of the above-mentioned substituents in 2- and 4-position are further substituted by from two to four lower alkyl radicals each alkyl having from 1 to 5 carbon atoms, and can also be substituted by from about one to two sulfonic acid groups.

The unsulfonated anthraquinone dyestuffs according to the invention are used advantageously as disperse dyes, while the mono- and di-sulfonated dyes are particularly suitable for the dyeing of wool and man-made polyamide fibers.

The production of the said dyestuffs is carried out by reacting an aminoanthraquinone dyestuff which contains at least one aromatic radical having a replaceable hydrogen atom bound to the anthraquinone nucleus by a hetero atom, with the N-methylol compound of a lower molecular α- or β-halogen fatty acid amide or with a functional derivative thereof which reacts in the same way as this methylol compound, the reaction being performed under such conditions that at least one halogen fatty acid amido methyl group is introduced. If necessary, the reaction product is then sulfonated and/or after-halogenated.

The carbacylamino methyl groups which are characteristic of the new dyestuffs according to the invention, contain a mobile halogen atom in the acyl radical, i.e. one which is easily split off in an alkaline medium by accepting the pair of electrons in the bond. The halogen atom is preferably bound in the α-position to the carbonyl group, and the acyl radical itself should have not more than four carbon atoms. Chiefly chlorine and bromine are used as halogens. The chloracetylaminomethyl group is preferred.

The introduction of these halogen fatty acid amido methyl groups into the organic dyestuff is achieved by the reaction with N-methylol compoounds of α- and β-halogen fatty acid amides under appropriate conditions, as e.g., they were made known by A. Einhorn (A. 343, 207 (1905) and ibid. 361, 113 (1908)). This author and others have described the products of condensation from halogen fatty acid-N-methylol amides with colorless aromatic compounds of the benzene and naphthalene series. It has now been found that also colored organic compounds, in fact aminoanthraquinone dyestuffs, enter into an Einhorn reaction. This is conditional upon these dyestuffs containing at least one hydrogen atom replaceable in the conditions in which the reaction takes place. It is preferable that the replaceable hydrogen atom should be on an aromatic ring system. The condensable aromatic radicals can be of either the isocyclic or the heterocyclic-aromatic series, in addition they can also be mono- or poly-cyclic. The more nucleophilic they are under the reaction conditions, the more easily the condensation with the methylol compounds proceeds and the greater are the yields. The acylaminomethylation can be favourably influenced by suitable nucleophilic substitution of the aromatic radical and also it is sometimes possible to determine the point at which the carbonamido-methyl group introduced is linked.

In the process according to the invention, the anthraquinone moiety of the dyestuff can be, for example, the radical of an α.α'-diamino-β-hydroxy-anthraquinone derivative, which contains a monovalent radical usable in the Einhorn reaction, advantageously a mono-nuclear aromatic radical of the benzene series.

This mono-nuclear radical is, for example, an aromatic radical such as, for example, a phenyl radical which is substituted by alkyl groups, preferably in para-position.

As defined, the new dyestuffs contain preferably at least one sulfonic acid group per dyestuff molecule. They can often be introduced by sulfonation in a conventional manner before or after the Einhorn reaction. In this case the reaction is so performed that advantageously 1 to 2 sulfonic acid groups are introduced.

The halogen fatty acid N-methylol amides, which according to the process employed in the invention enter into consideration as second reaction component, are obtained by the addition of formaldehyde to α- or β-halogen fatty acid amides with the assistance of basic condensing agents such as potassium carbonate, or else by the action of mineral acid under mild reaction conditions. In the process under review it is above all the N-methylol compounds of monochloracetamide, monobromoacetamide, α-bromo-propionic acid amide, β-chloro- and β-bromo-propionic acid amide as well as of α,β-dichloro-propionic acid amide which are of importance. N-methylol chloracetamide is the reactant to be preferred, both in consideration of its easy accessability and with regard to the good quality as dyes of the end products obtained by its use.

The condensation of the dyestuffs with the methylol compounds takes place in the presence of acid condensing agents or agent splitting off water which react in the same way. Among these, concentrated hydrochloric acid, zinc chloride, phosphorus pentoxide, acetic acid anhydride, syrupy phosphoric acid and fuming sulfuric acid are particularly applicable. The condensing agent to be preferred however, is sulfuric acid concentrated until anhydrous, as normally it can be used at the same time as a solvent for the reactants. The temperature at which the reaction takes place may vary within a wide range and depends above all on the condensing agent used. In concentrated sulfuric acid, the reaction will normally proceed quickly and completely even at room temperature. In some cases it is necessary to work at a higher temperature, e.g. from 40–80° C., particularly when several carbon amido-methyl groups are to be introduced. It must be predicated however, that the reactants in these conditions are not taken down, and that if necessary the occurrence of sulfonation of the product of the reaction is admissible. The final products of the reaction are separated by pouring the solutions or suspensions in sulfuric acid into ice-water, and isolated in the usual manner.

In place of the halogen fatty acid-N-methylol amides, reactive functional derivatives of these methylol compounds may be used, insofar as they react analogously. For example, the esters obtained by treating the methylol compounds with inorganic acids or acid halides or anhydrides come under this heading, as do the di-(fatty acid amido-methyl) ethers obtained by self-condensation in the presence of, e.g., phosphorous oxychloride. As however, these functional derivatives must be prepared from the methylol compounds the method mentioned first is ordinarily preferred. Nevertheless, in individual cases in which the Einhorn-like process does not lead to satisfactory results, it is possible to achieve the desired end by means of these derivatives, above all with the N-chloromethyl amides. In some cases it is possible to simplify the process according to the invention by utilizing for the reaction in one step a mixture of the dyestuff with formaldehyde and the halogen fatty acid amide, instead of proceeding from the prepared methylol derivatives of the amides.

In all cases the treatment and isolation of the products of the reaction is to be undertaken in the most suitable conditions possible, so that the halogen atom linked to the fatty acid radical is not split off.

DETAILED DESCRIPTION OF INVENTION AND PREFERRED EMBODIMENT THEREOF

More particularly, the invention comprises the dyestuffs which are mixtures the average composition of which corresponds to the formula

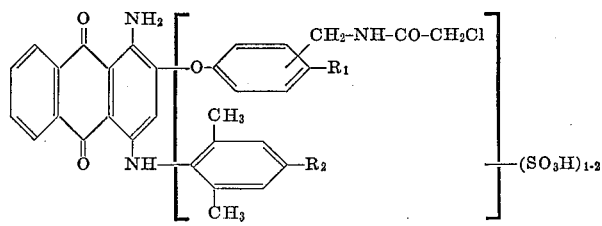

(I)

wherein each of $R_1$ and $R_2$ represents hydrogen or alkyl of from 1 to 5 carbon atoms, and which dyestuffs are sulfonated with from one to two sulfonic acid groups, preferably with about one sulfonic acid group; these dyestuffs dye wool and man-made polyamide fibers in violet shades which, besides having very good light fasteners, are particularly wet-fast, and especially fast to washing, e.g. in water, and to alkaline milling.

The dyestuff in which $R_1$ represents alkyl of from 4 to 5 carbon atoms and $R_2$ represents methyl is most preferred.

More detailed particulars of the production and use of the new dyestuffs via the unsulfonated dyes corresponding to those of Formula I are made clear from the following examples. These serve merely to illustrate the invention and, therefore, in no way limit it. The parts and percentages in these examples are by weight, unless expressly stated otherwise, and the temperatures are given in degrees centigrade. The relationship of parts by weight to parts by volume is as that of grams to milliliters.

EXAMPLE 1

15.6 Parts of 1-amino-2-(4'-amyl-phenoxy)-4-(2',4',6',-trimethyl-phenylamino)-anthraquinone of the formula

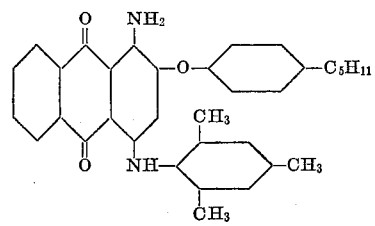

are mixed with 3.91 parts of N-methylol chloracetamide, and the mixture is added at 0 to 5° to 140 parts of 90% sulfuric acid. The mixture is then stirred for 24 hours at the same temperature and afterwards poured onto ice. The precipitate obtained, the major portion of which, exceeding 90% by weight, consists of the two isomers of the formula:

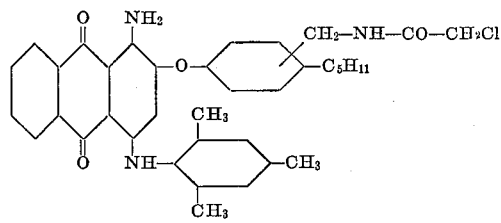

and the balance of which consists of the compound of the formula

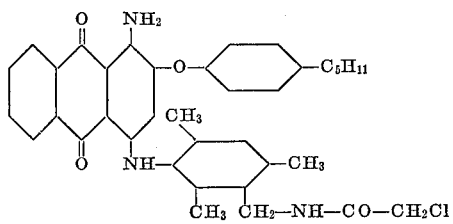

is filtered off, washed until the washing water is neutral and dried. On sulfonating for 1 hour at 18 to 20° in 9% oleum, a dyestuff is obtained which contains one sulfonic acid group per molecule linked to a carbon atom in a benzene ring of the above formulas. This sulfonated dyestuff is a mixture of all isomers falling under the formulas:

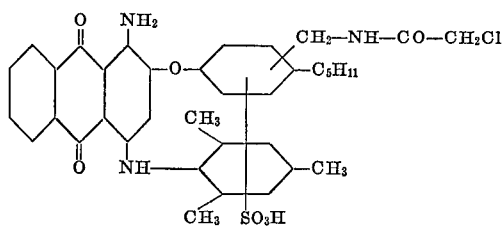

and

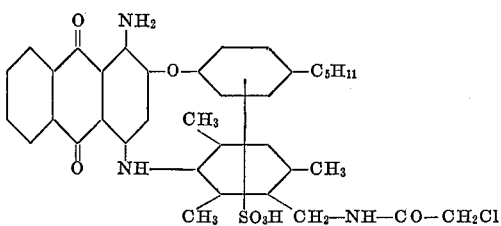

It dyes wool from a weakly acid bath in fast bluish-violet shades.

While it is possible to isolate the isomers constituting the above dyestuff by known chromatographic techniques, and to identify the position of the fiber-reactive Einhorn groups and of the sulfonic acid groups in each isomer from its magneto-nuclear resonance spectrum, such further workup will not lead to products of improved properties, and is moreover, highly uneconomical, so that it is of no practical value.

If in the above example, under otherwise the same conditions, 13.08 parts of 1-amino-2-phenoxy-4-(2',6'-dimethylphenylamino)-anthraquinone or 13.5 parts of 1-amino - 2 - phenoxy-4-(2',4',6'-trimethyl-phenylamino)-anthraquinone or 15.15 parts of 1-amino-2-(4'-tert. butyl)-phenoxy - 4-(2',4',6'-trimethylphenylamino)-anthraquinone are used, then correspondingly substituted dyestuffs are obtained which dye wool and man-made polyamide fibers in violet shades of the same wet fastness properties as the dyestuffs described in the foregoing examples.

Sulfonation with 20% oleum at 30 to 35° affords the corresponding disulfonated products.

EXAMPLE 2

100 parts of wool flannel are introduced into a dyebath which contains 1 part of the dyestuff according to Example 1 and 3 parts of ammonium sulfate or 5 parts of ammonium acetate and 10 parts of Glauber's salt in 3000 parts of water. The temperature on introducing the goods is 40 to 45° and within half an hour it is gradually brought to the boil and kept at the light boil for half an hour. The very level violet wool dyeing obtained has very good fastness to milling, seawater and light.

We claim:
1. A dyestuff of the formula:

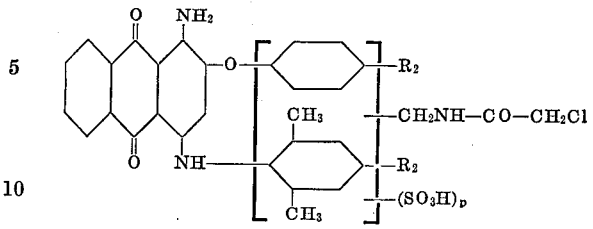

wherein each of $R_1$ and $R_2$ represents hydrogen or alkyl of from one to five carbon atoms, and $p$ represents a number ranging from 0 to 2, the —$CH_2$—NH—CO—$CH_2Cl$ and —$SO_3H$ groups present being bound to ring carbon atoms.

2. A dyestuff as defined in claim 1, wherein $p$ represents a numeral ranging from 1 to 2.

3. A dyestuff as defined in claim 1, wherein $R_2$ represents methyl and $p$ represents a numeral ranging from 1 to 2.

4. A dyestuff as defined in claim 1, wherein $R_1$ represents amyl, $R_2$ represents methyl and $p$ represents a numeral ranging from 1 to 2.

5. A dyestuff as defined in claim 1, which is of the formula:

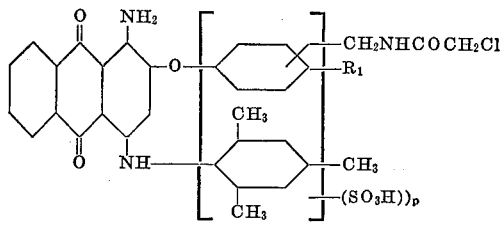

in which formula $R_1$ represents hydrogen or alkyl of from one to five carbon atoms and $p$ represents a number ranging from 1 to 2.

6. A dyestuff as defined in claim 1, which is of the formula

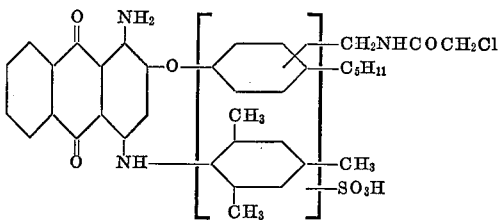

No references cited.

LORRAINE A. WEINBERGER, Primary Examiner

H. C. WEGNER, Assistant Examiner

U.S. Cl. X.R.

8—39; 260—377, 380